US009007569B2

(12) United States Patent
Amzajerdian et al.

(10) Patent No.: US 9,007,569 B2
(45) Date of Patent: Apr. 14, 2015

(54) COHERENT DOPPLER LIDAR FOR MEASURING ALTITUDE, GROUND VELOCITY, AND AIR VELOCITY OF AIRCRAFT AND SPACEBORNE VEHICLES

(75) Inventors: Farzin Amzajerdian, Yorktown, VA (US); Diego F. Pierrottet, Poquoson, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 351 days.

(21) Appl. No.: 13/566,077

(22) Filed: Aug. 3, 2012

(65) Prior Publication Data

US 2014/0036252 A1    Feb. 6, 2014

(51) Int. Cl.
| | |
|---|---|
| *G01P 3/68* | (2006.01) |
| *G01S 17/58* | (2006.01) |
| *G01S 17/32* | (2006.01) |
| *G01S 17/87* | (2006.01) |

(52) U.S. Cl.
CPC . *G01P 3/68* (2013.01); *G01S 17/58* (2013.01); *G01S 17/325* (2013.01); *G01S 17/875* (2013.01)

(58) Field of Classification Search
CPC ..... G01S 13/003; G01S 17/87; G01S 17/026; G01P 3/36
USPC ................................. 356/3.01–28.5
See application file for complete search history.

(56) References Cited

U.S. PATENT DOCUMENTS

| 6,414,746 B1 | 7/2002 | Stettner et al. |
| 7,359,057 B2 | 4/2008 | Schwiesow |
| 7,361,922 B2 | 4/2008 | Kameyama et al. |
| 2008/0024352 A1* | 1/2008 | Shirakawa ................ 342/28 |
| 2011/0037970 A1* | 2/2011 | Rogers et al. ............. 356/28 |
| 2011/0224840 A1 | 9/2011 | Vanek |
| 2012/0033196 A1 | 2/2012 | Vanek et al. |

OTHER PUBLICATIONS

Alexander Bulyshev, et al., "Super Resolution Image Enhancement For A Flash Lidar: Back Projection Method," SPIE Defense Symposium, Apr. 5-9, 2010.
Alexander Bulyshev et al., "Computational Experiments on Super-resolution Enhancement of Flash Lidar Data," Proc. of SPIE, May 2010, vol. 7684.
A. Neumaier, "Solving Ill-Conditioned and Singular Linear Systems: A Tutorial On Regularization," SIAM Review 40, 1998, pp. 636-666.

(Continued)

*Primary Examiner* — Luke Ratcliffe
(74) *Attorney, Agent, or Firm* — Andrea Z. Warmbier

(57) ABSTRACT

A Doppler lidar sensor system includes a laser generator that produces a highly pure single frequency laser beam, and a frequency modulator that modulates the laser beam with a highly linear frequency waveform. A first portion of the frequency modulated laser beam is amplified, and parts thereof are transmitted through at least three separate transmit/receive lenses. A second portion of the laser beam is used as a local oscillator beam for optical heterodyne detection. Radiation from the parts of the laser beam transmitted via the transmit/receive lenses is received by the respective transmit/receive lenses that transmitted the respective part of the laser beam. The received reflected radiation is compared with the local oscillator beam to calculate the frequency difference therebetween to determine various navigational data.

16 Claims, 2 Drawing Sheets

(56) References Cited

OTHER PUBLICATIONS

Adam Rybaltowski, et al., "Signal-to-noise ratio in direct-detection mid-infrared Random-Modulation Continuous-Wave lidar in the presence of colored additive noise," Optics Express, Oct. 8, 2001, pp. 386-399, vol. 9, No. 8.

N. Takeuchi, et al., "Random modulation cw lidar," Applied Optics, May 1, 1983, pp. 1382-1386, vol. 22, No. 9.

Sung Cheol Park, et al., "Super-Resolution Image Reconstruction: A Technical Overview," IEEE Signal Processing Magazine, May 2003, pp. 21-36.

Sina Farsiu, et al., "Fast and Robust Multiframe Super Resolution," IEEE Transactions on Image Processing. Oct. 2004. pp. 1327-1344, vol. 13, No. 10.

S. Susan Young and Ronald G. Driggers, "Superresolution image reconstruction from a sequence of aliased imagery," Applied Optics, Jul. 20, 2006, pp. 5073-5085, vol. 45, No. 21.

G. T. Clement, et al., "Superresolution ultrasound imaging using back-projected reconstruction," J. Acoust. Soc. Am., Dec. 2005, pp. 3953-3960.

Subhasis Chaudhuri, "Super-Resolution Imaging," 2001, pp. 6-12, Kluwer Academic Publishers.

Chirold D. Epp, et al., "Autonomous Landing and Hazard Avoidance Technology (ALHAT)," IEEE Aerospace Conference, 2008, pp. 1-7.

Qingxiong Yang, et al., "Spatial-Depth Super Resolution for Range Images." IEEE Conference on Computer Vision and Pattern Recognition, 2007, pp. 1-6.

Shuowen Hu, et al,. "Super-Resolution for Flash LADAR Data," Proc. of SPIE, 2009, pp. 73000B-1-73000B-12, vol. 7300.

Shuowen Hu, et al., "Super-resolution for flash ladar imagery," Applied Optics: Feb. 10, 2010, pp. 772-780, vol. 49, No. 5.

Feng-Qing Qin, et al., "Video supperresolution reconstruction based on subpixel registration arid iterative back projection," Journal of Electronic Imaging, Jan.-Mar. 2009, pp. 013007-1-013007-11, vol. 18(1).

Diego F. Pierrottet, et al., "Characterization of 3-D imaging lidar for hazard avoidance and autonomous landing on the Moon," Proceedings of SPIE, 2007, pp. 1-9.

Alexander Bulyshev, et al., "Processing of 3-dimensional flash lidar terrain images generated from an airborne platform," Proc. of SPIE, 2009, pp. 732901-1-732901-9, vol. 7329.

G. Brauer, et al., "Capabilities and applications of the program to optimze simulated trajectories (POST)," NASA CR-2770. Feb. 1977, pp. 45-64.

Jody L. Davis, et al., "Advances in POST2 End-to-End Descent and Landing Simulation for the ALHAT Project," AIAA, 2008, pp. 1-14.

Gavin Rosenbush, et al., "Super-Resolution Enhancement of Flash LADAR Range Data," Proc. of SPIE, 2007, pp. 673614-1-673614-10, vol. 6736.

Bruce D. Lucas, et al., "An Iterative Image Registration Technique with an Application to Stereo Vision," Proceedings of Imaging Understanding Workshop, 1981, pp. 121-130.

Germund Dahlquist, et al., "Numerical Methods," 1974, p. 572, Prentice-Hall, Inc.

Lertrattanapanich, S. and Bose, N. K., "Latest Results on High-Resolution Reconstruction from Video Sequences," Technical Report, IEICE, DSP99140, The Institution of Electronic, Information and Communication Engineers, 1999.

\* cited by examiner

COHERENT DOPPLER LIDAR FOR MEASURING ALTITUDE, GROUND VELOCITY, AND AIR VELOCITY OF AIRCRAFT AND SPACEBORNE VEHICLES

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

TECHNICAL FIELD

The invention generally relates to a Doppler lidar (laser radar) sensor system, and a method of generating a sensor signal for measuring an altitude, ground velocity and air velocity of a vehicle, such as an aircraft or a spaceborne vehicle, with a lidar sensor system.

BACKGROUND OF THE INVENTION

Various tasks related to space navigation, such as landing on the Moon or Mars, Earth re-entry, or docking with another space craft, require very precise navigational data. This navigational data may include, for example, a range to a ground surface, a ground velocity of the space craft, or an air velocity of the space craft. Highly precise navigational data would enable spaceborne vehicles to navigate, with a high degree of precision, to an intended landing site. Additionally, the range to the ground surface measured along three or more different line-of sites would allow the determination of the vehicle attitude angles relative to the ground. Furthermore, the air velocity of the vehicle may be used to derive the vehicle's angles of attack and side slip, which may be used for guidance and control of the vehicle.

SUMMARY OF THE INVENTION

A Doppler lidar sensor system is provided. The Doppler lidar sensor system includes a laser generator that produces a single frequency laser beam. A frequency modulator is coupled to and in communication with the laser generator. The frequency modulator receives the laser beam from the laser generator, and linearly modulates the frequency of the laser beam to produce a triangular waveform with a very high degree of linearity. An amplifier is coupled to and in communication with the frequency modulator. The amplifier receives a first portion of the modulated laser beam, and amplifies the power of the first portion of the modulated laser beam. The Doppler lidar sensor system further includes at least three transmit/receive lenses and at least three photoreceivers. Each of the transmit/receive lenses is coupled to and in communication with the amplifier, and receives a part of the first portion of the amplified laser beam from the amplifier, transmits the part of the first portion of the laser beam, and receives reflected radiation from the transmitted laser beam. Each of the photoreceivers is in communication with one of the transmit/receive lenses. Each of the photoreceivers receives the reflected radiation from a respective transmit/receive lens, and mixes the received reflected radiation with a part of a second portion of the modulated laser beam for optical heterodyne detection. The Doppler lidar sensor system further includes at least three transmit/receive switches. Each of the transmit/receive switches is disposed between and interconnects the amplifier and one of the transmit/receive lenses. Each of the transmit/receive switches directs the received reflected radiation from the respective transmit/receive lens to a respective one of the photoreceivers.

A sensor system for measuring an altitude, an attitude, a ground velocity or an air velocity of a vehicle is also provided. The sensor system includes a laser generator that produces a single frequency laser beam. The laser generator may include one of a fiber laser with volume grating, or a semiconductor laser with an external cavity Bragg grating. An electro-optical frequency modulator is coupled to and in communication with the laser generator. The electro-optical frequency modulator receives the laser beam from the laser generator, and modulates the frequency of the laser beam. A single mode fiber amplifier is coupled to and in communication with the electro-optical frequency modulator. The single mode fiber amplifier receives a first portion of the modulated laser beam, and amplifies the power of the first portion of the modulated laser beam. The sensor system further includes at least three transmit/receive lenses. Each of the transmit/receive lenses is coupled to and in communication with the single mode fiber amplifier. Each of the transmit/receive lenses receives a part of the first portion of the amplified laser beam from the single mode fiber amplifier, transmits the part of the first portion of the laser beam, and receives reflected radiation from the transmitted laser beam. Each of the at least three transmit/receive lenses are aimed to transmit the laser beam in a different direction, and are stationary relative to each other. A polarization adjuster is coupled to and in communication with the electro-optical frequency modulator. The polarization adjuster receives a second portion of the modulated laser beam, and rotates the polarization of the second portion of the modulated laser beam to define a local oscillator beam. The sensor system further includes at least three photoreceivers. Each of the photoreceivers is in communication with one of the transmit/receive lenses and with the polarization adjuster. Each of the photoreceivers receives the reflected radiation from a respective transmit/receive lens, and mixes the received reflected radiation with a part of the local oscillator beam for optical heterodyne detection. The sensor system further includes at least three transmit/receive switches. Each of the transmit/receive switches is disposed between and interconnects the single mode fiber amplifier and one of the transmit/receive lenses. Each of the transmit/receive switches directs the part of the first portion of the amplified laser beam from the single mode fiber amplifier to a respective transmit/receive lens, and directs the received reflected radiation from the respective transmit/receive lens to one of the at least three photoreceivers.

A method of generating a lidar sensor signal for measuring an altitude, an attitude, a ground velocity or an air velocity of a vehicle is also provided. The method includes generating a laser beam having a single frequency. The frequency of the laser beam is modulated, and a first portion of the modulated laser beam is amplified. At least three equal parts of the first portion of the laser beam are transmitted toward a target with at least three transmit/receive lenses. Each of the transmit/receive lenses transmits a respective part of the first portion of the laser beam in a different direction relative to the other transmit/receive lenses. Reflected radiation from each of the transmitted parts of the first portion of the laser beam is received with the same transmit/receive lens used to transmit each of the respective parts of the first portion of the laser beam. The received reflected radiation from each part of the transmitted first portion of the laser beam is compared with one part of a local oscillator beam to determine the frequency difference between the frequency of the received reflected radiation and the frequency of the polarization adjuster beam to determine at least one of the altitude of the vehicle, attitude of the vehicle, the ground velocity of the vehicle, or the air velocity of the vehicle.

The above features and advantages and other features and advantages of the present invention are readily apparent from the following detailed description of the best modes for carrying out the invention when taken in connection with the accompanying drawings.

DETAILED DESCRIPTION OF THE INVENTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
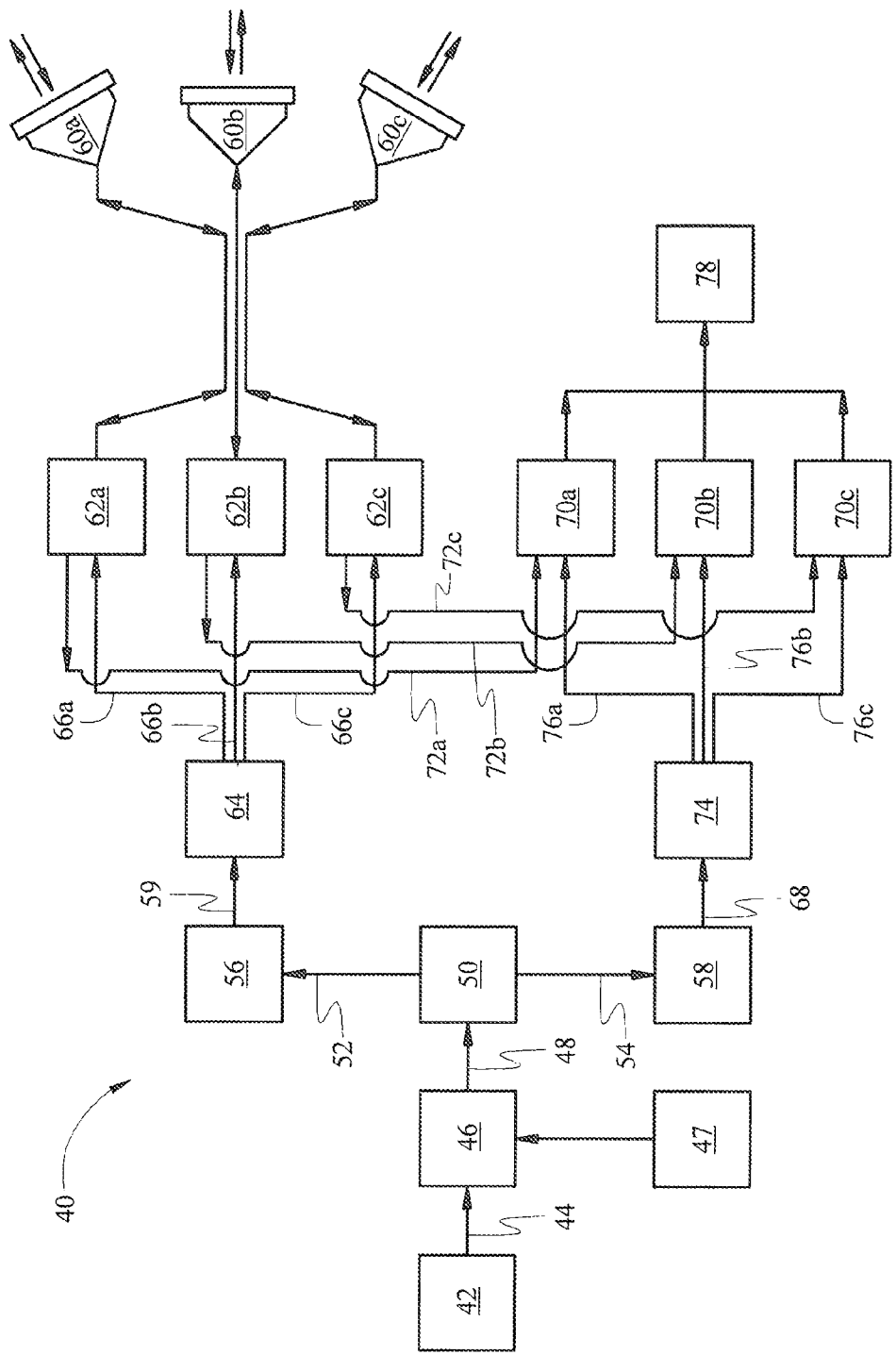
FIG. 1 is a schematic diagram of a Doppler lidar sensor system.

Referring to the Figures, wherein like numerals indicate like parts throughout the several views, a Doppler lidar sensor system is generally shown at 40 in FIG. 1. The Doppler lidar sensor system 40 generates a lidar sensor signal for measuring at least one of an altitude, an attitude, a ground velocity or an air velocity of a vehicle. The vehicle may include any vehicle, including but not limited to a spaceborne vehicle or an aircraft.

Referring to FIG. 1, the sensor system 40 includes a laser generator 42. The laser generator 42 produces or generates a relatively low power laser beam having a very narrow linewidth, i.e., a single frequency laser beam. The laser beam is generally indicated at 44. The laser generator 42 may produce a laser beam having a power of between, for example, 0.02 and 0.1 watts. The laser generator 42 may include, for example, one of a fiber laser with volume grating, or a semiconductor laser with an external cavity Bragg grating.

A frequency modulator 46 is coupled to and in communication with the laser generator 42. The frequency modulator 46 receives the laser beam from the laser generator 42 and modulates the frequency of the laser beam to define a modulated laser beam having a laser waveform, which is described in greater detail below. The modulated laser beam is generally indicated at 48. The frequency modulator 46 may include, for example, an electro-optical frequency modulator 46.

The frequency modulator 46 may include an electric ramp generator 47, which drives frequency modulator 46 with a pre-defined modulation waveform to define a modulated waveform. The electric ramp generator 47 may include a voltage controlled oscillator controlled by a digital micro-controller. The digital micro-controller generates a pre-defined ramp, which is provided to the voltage controlled oscillator to create the pre-defined modulation waveform. For example, the digital micro-controller may generate a nearly perfect linear ramp to create the linear frequency modulation waveform.

The electric ramp generator 47 controls the frequency modulator 46 to modulate the laser beam to define the modulated waveform. The linear ramp output from the digital micro-controller includes a deviation from a perfect ramp that is less than or equal to 100 KHz, or less than 0.001%. The linear ramp includes a frequency chirp with a bandwidth B over a time period T, and a modulation offset frequency $\omega_m$ that is offset from Direct Current, i.e., $\omega_o$. Alternatively, the modulation offset frequency $\omega_m$ of the linear ramp is between the range of 2.0 GHz and 30 GHz, and may be equal to 6.0 GHz, and the bandwidth B of the linear ramp may be between the range of 300 MHz and 8.0 GHz, and is may be equal to 600 MHz over a time period T between the range of 0.02 msec and 2.0 msec, and may be equal to 0.15 msec. However, it should be appreciated that the values of the modulation offset frequency $\omega_m$, the bandwidth B of the linear ramp, and the time period T may differ from the values described above.

A primary laser beam splitter 50 is disposed downstream of the frequency modulator 46, and receives the modulated laser beam output from the frequency modulator 46. The primary laser beam splitter 50 splits the modulated laser beam from the frequency modulator 46 into a first portion, generally indicated at 52, and a second portion, generally indicated at 54. The primary laser beam splitter 50 is disposed between and interconnects an amplifier 56 and a polarization adjuster 58 with the frequency modulator 46. The primary laser beam splitter 50 directs the first portion of the modulated laser beam toward the amplifier 56, and directs the second portion of the modulated laser beam toward the polarization adjuster 58 for use as a local oscillator.

The amplifier 56 is in communication with the frequency modulator 46, and receives the first portion of the modulated laser beam from the primary laser beam splitter 50. The amplifier 56 amplifies the power of the first portion of the modulated laser beam to several watts to define an amplified laser beam, generally indicated at 59. For example, the amplifier 56 may increase the power of the laser beam to a range between 5 and 50 watts. The amplifier 56 may include, for example, a single mode fiber amplifier 56. The fiber amplifier 56 may be operated at less than a 100% duty factor, i.e., a pulsed mode, in order to reduce the power consumption of the sensor system 40. For example, the fiber amplifier 56 may operate at less than a 10% duty factor, and be enabled for a few milliseconds at about a 30 Hz rate.

The sensor system 40 further includes at least three transmit/receive lenses 60a, 60b, 60c. Each of the transmit/receive lenses 60a, 60b, 60c is in communication with the amplifier 56. Each of the transmit/receive lenses 60a, 60b, 60c receives a part of the first portion of the amplified laser beam from the amplifier 56, expands and transmits their respective part of the first portion of the laser beam, and receives reflected radiation from their respective part of the first portion of the laser beam transmitted therefrom and focuses the reflected radiation into optical fibers. Each of the transmit/receive lenses 60a, 60b, 60c receives the reflected radiation from their respective transmitted parts of the first portion of the laser beam with the same transmit/receive lens 60a, 60b, 60c used to transmit each of their respective parts of the first portion of the laser beam. As such, each transmit/receive lens 60a, 60b, 60c transmits a part of the first portion of the laser beam and receives the reflected radiation from that transmitted part. While the sensor system 40 is shown in FIG. 1 with three transmit/receive lenses 60a, 60b, 60c, it should be appreciated that the sensor system 40 may include any number of transmit/receive lenses greater than three. Each of the at least three transmit/receive lenses 60a, 60b, 60c is aimed to transmit their respective part of the first portion of the laser beam in a different direction. Because the sensor system 40 includes at least three transmit/receive lenses 60a, 60b, 60c, each directed at a different direction, all of the transmit/receive lenses 60a, 60b, 60c may remain stationary relative to each other, i.e., the lenses do not move or scan.

The sensor system 40 further includes at least three transmit/receive switches 62a, 62b, 62c. The number of transmit/receive switches 62a, 62b, 62c is equal to the number of transmit/receive lenses 60a, 60b, 60c. Each of the transmit/receive switches 62a, 62b, 62c is disposed between and interconnects the amplifier 56 and one of the transmit/receive lenses 60a, 60b, 60c. Each of the transmit/receive switches 62a, 62b, 62c directs a respective part of the first portion of the amplified laser beam from the amplifier 56 to a respective transmit/receive lens 60a, 60b, 60c, and directs the received reflected radiation from the respective transmit/receive lens 60a, 60b, 60c to a respective photoreceiver 70a, 70b, 70c, described in greater detail below.

A laser beam splitter 64 is disposed between and interconnects the amplifier 56 and the at least three transmit/receive switches 62a, 62b, 62c. The laser beam splitter 64 splits the first portion of the amplified laser beam into equal parts, and directs one of the parts of the first portion of the laser beam toward each of the transmit/receive switches 62a, 62b, 62c. The parts of the first portion of the laser beam are generally indicated at 66a, 66b, 66c. The laser beam splitter 64 splits the first portion of the laser beam into a number of parts equal to the number of transmit/receive lens 60a, 60b, 60c.

The polarization adjuster 58 is in communication with the frequency modulator 46. The polarization adjuster 58 receives the second portion of the modulated laser beam from the primary laser beam splitter 50, and adjusts the polarization of the second portion of the modulated laser beam to define a local oscillator beam, generally indicated at 68, that matches the polarization of each of the returned signals 72a, 72b, 72c.

The sensor system 40 further includes at least three photoreceivers 70a, 70b, 70c (mentioned above). Each of the photoreceivers 70a, 70b, 70c is in communication with one of the transmit/receive lenses 60a, 60b, 60c. Each photoreceiver 70a, 70b, 70c receives the reflected radiation, generally indicated at 72a, 72b, 72c respectively, from a respective one of the transmit/receive lens 60a, 60b, 60c.

A photoreceiver laser beam splitter 74 is disposed between and interconnects the polarization adjuster 58 and the at least three photoreceivers 70a, 70b, 70c. The photoreceiver laser beam splitter 74 splits the local oscillator beam 68 into equal parts directed toward each of the photoreceivers 70a, 70b, 70c. The parts of the local oscillator beam are generally indicated at 76a, 76b, 76c. The photoreceiver laser beam splitter 74 splits the local oscillator beam into a number of parts equal to the number of photoreceivers 70a, 70b, 70c, and directs each part of the local oscillator beam to a respective one of the photoreceivers 70a, 70b, 70c. Each of the photoreceivers 70a, 70b, 70c receives their respective part of the local oscillator beam and their respective reflected radiation from their respective transmit/receive switch 62a, 62b, 62c, and mixes the two together for optical heterodyne detection.

The sensor system 40 may include a processor 78 that is coupled to and in communication with each of the photoreceivers 70a, 70b, 70c. The processor 78 analyzes and stores that data received from the photoreceivers 70a, 70b, 70c, and uses the data to calculate and/or determine the various navigational data described above. The processor 78 compares the received reflected radiation form each part of the transmitted first portion of the laser beam with one part of the local oscillator signal to determine a frequency difference therebetween of reflected signals 72a, 72b, 72c and the local oscillator beams 76a, 76b, 76c to calculate at least one of the attitude of the vehicle, the altitude of the vehicle, the ground velocity of the vehicle, or the air velocity of the vehicle. More specifically, the processor 78 performs a Fourier Transform algorithm to extract the frequency of each of the at least three signals. From these frequencies, the Line-Of-Site (LOS) distance and velocities are determined through simple calculations known to those skilled in the art. The LOS measurements may then be used to determine the vehicle altitude and attitude, i.e., orientation angles, with respect to the ground, the vehicle vector ground velocity (three components of velocity), vehicle vector air velocity, and vehicle angle of attack and sideslip (orientation angels with respect to local air mass).

Figure 2:
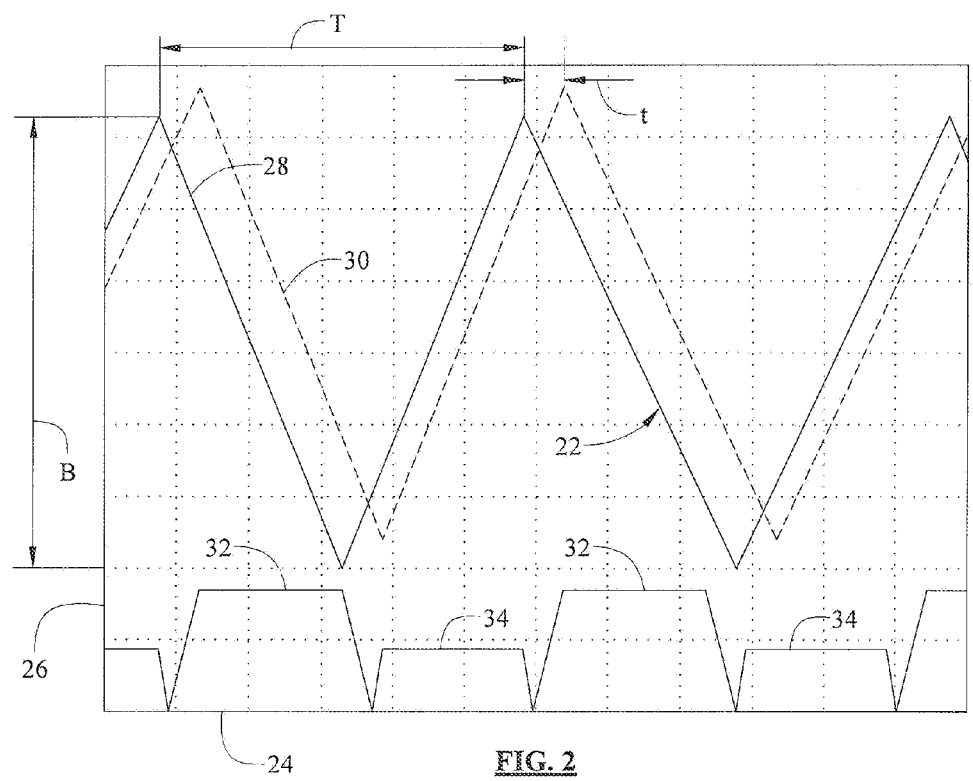
FIG. 2 is a graph of a linear triangular frequency modulated waveform of a laser beam.

Referring to FIG. 2, the frequency modulator 46 outputs a frequency modulated linear laser waveform, which is generally shown at 22. Within FIG. 2, time is shown along a horizontal axis 24, and the frequency of the modulated linear waveform is shown along a vertical axis 26. As shown in FIG. 2, the modulated linear laser waveform 22 includes and/or defines a triangular or sawtooth shape. The modulated linear waveform 22 is shown being transmitted at 28, and is shown being received at 30 upon reflection off of a target. The modulated linear laser waveform 22 is delayed between transmission and receipt by a light round trip time (t). The delay between the received modulated linear waveform 30 and the transmitted modulated linear waveform 28 causes the mixing of the received modulated linear waveform 30 and the transmitted modulated linear waveform 28 at the photoreceivers 70a, 70b, 70c, to generate an interference signal. The frequency of the interference signal is equal to the difference between frequency of the transmitted modulated linear waveform 28 and the frequency of the received modulated linear waveform 30. The frequency of the interference signal is directly proportional to a distance to the target. The frequency of the interference signal shifts due to the Doppler effect when the target and/or the sensor system 40 moves relative to the other during time t. Therefore, by measuring the frequency of the interference signal during "up chirp" periods, generally indicated at 34, and during "down chirp" periods, generally indicated at 32, both the target range and velocity may be determined. Furthermore, in the presence of atmosphere, the air velocity may also be measured by receiving the scattered laser light off the naturally occurring aerosols. These aerosols create a Doppler frequency shift the same as the returned light from the target. By simply measuring the frequency of the return signal at the output of the photoreceivers 70a, 70b, 70c, the sensor system 40 may also be utilized to sense the atmospheric air velocity.

While the best modes for carrying out the invention have been described in detail, those familiar with the art to which this invention relates will recognize various alternative designs and embodiments for practicing the invention within the scope of the appended claims.

The invention claimed is:

1. A Doppler lidar sensor system comprising:
    a laser generator configured for producing a single frequency laser beam;
    a frequency modulator coupled to and in communication with the laser generator and configured for receiving the laser beam from the laser generator and for linearly modulating the frequency of the laser beam to produce a triangular waveform with a very high degree of linearity;
    an amplifier coupled to and in communication with the frequency modulator and configured for receiving a first portion of the modulated laser beam and amplifying the power of the first portion of the modulated laser beam;
    at least three transmit/receive lenses, with each of the transmit/receive lenses coupled to and in communication with the amplifier and configured for receiving a part of the first portion of the amplified laser beam from the amplifier, transmitting the part of the first portion of the laser beam, and receiving reflected radiation from the transmitted laser beam;

at least three photoreceivers, with each of the photoreceivers in communication with one of the transmit receive lenses and configured for receiving the received reflected radiation from a respective transmit/receive lens and mixing the received reflected radiation with a part of a second portion of the modulated laser beam for optical heterodyne detection;

at least three transmit/receive switches, with each of the transmit/receive switches disposed between and interconnecting the amplifier and one of the transmit/receive lenses, and with each of the transmit/receive switches configured for directing the received reflected radiation from their respective transmit/receive lens to one of the at least three photoreceivers; and a polarization adjuster coupled to and in communication with the frequency modulator, and configured for receiving the second portion of the modulated laser beam and adjusting the polarization of the second portion of the modulated laser beam to define a local oscillator beam for use as a local oscillator in optical heterodyne detection.

2. The Doppler lidar sensor system as set forth in claim 1, further comprising a primary laser beam splitter disposed between and interconnecting the amplifier and the frequency modulator, and configured for splitting the modulated laser beam into the first portion directed toward the amplifier and the second portion directed toward the photoreceivers as a local oscillator.

3. The Doppler lidar sensor system as set forth in claim 2, further compromising a laser beam splitter disposed between and interconnecting the amplifier and the at least three transmit/receive switches, and configured for splitting the first portion of the amplified laser beam into equal parts directed toward each of the transmit/receive switches.

4. The Doppler lidar sensor system as set forth in claim 2, further comprising a photoreceiver laser beam splitter disposed between and interconnecting the polarization adjuster and the at least three photoreceivers, and configured for splitting the local oscillator beam from the polarization adjuster into equal parts directed toward each of the photoreceivers.

5. The Doppler lidar sensor system as set forth in claim 1, wherein each of the at least three transmit/receive lenses are aimed to transmit the laser beam in a different direction.

6. The Doppler lidar sensor system as set forth in claim 1, wherein each of the at least three transmit/receive lenses are stationary relative to each other.

7. The Doppler lidar sensor system as set forth in claim 1, wherein the frequency modulator includes an electro-optical frequency modulator.

8. The Doppler lidar sensor system as set forth in claim 7, wherein the frequency modulator includes an electric ramp generator configured for generating a ramp having a frequency chirp with a bandwidth B over time period T, and a modulation offset frequency $\omega_m$ for controlling the frequency modulator to modulate the laser beam to define a modulated waveform.

9. The Doppler lidar sensor system as set forth in claim 8, wherein the linear ramp includes a deviation of less than or equal to 100 KHz, the modulation offset frequency $\omega_m$ of the linear ramp is between the range of 2.0 GHz and 30 GHz, and the bandwidth B of the linear ramp is between the range of 300 MHz and 8.0 GHz over a time period between the range of 0.02 msec and 2.0 msec.

10. The Doppler lidar sensor system as set forth in claim 1, wherein the laser generator includes one of a fiber laser with volume grating or a semiconductor laser with an external cavity Bragg grating.

11. The Doppler lidar sensor system as set forth in claim 1, wherein the amplifier includes a single mode fiber amplifier.

12. The Doppler lidar sensor system as set forth in claim 1, further comprising a processor coupled to and in communication with each of the photoreceivers and configured for analyzing data received from the photoreceivers and transmitting the processed data to a vehicle navigation, guidance and control computer.

13. A sensor system for measuring an altitude, an attitude, a ground velocity or an air velocity of a vehicle, the sensor system comprising:

a laser generator configured for producing a single frequency laser beam;

wherein the laser generator includes one of a fiber laser with volume grating or a semiconductor laser with an external cavity Bragg grating;

a electro-optical frequency modulator coupled to and in communication with the laser generator and configured for receiving the laser beam from the laser generator and for linearly modulating the frequency of the laser beam to produce a triangular waveform with a very high degree of linearity;

a single mode fiber amplifier coupled to and in communication with the electro-optical frequency modulator and configured for receiving a first portion of the modulated laser beam and amplifying the power of the first portion of the modulated laser beam;

at least three transmit/receive lenses, with each of the transmit/receive lenses coupled to and in communication with the single mode fiber amplifier and configured for receiving a part of the first portion of the amplified laser beam from the single mode fiber amplifier, transmitting the part of the first portion of the laser beam, and receiving reflected radiation from the transmitted laser beam;

wherein each of the at least three transmit/receive lenses are aimed to transmit the laser beam in a different direction, and wherein each of the at least three transmit/receive lenses are stationary relative to each other;

a polarization adjuster coupled to and in communication with the electro-optical frequency modulator, and configured for receiving a second portion of the modulated laser beam and adjusting the polarization of the second portion of the modulated laser beam to define a local oscillator beam;

at least three photoreceivers, with each of the photoreceivers in communication with one of the transmit/receive lenses and with the polarization adjuster, and configured for receiving the received reflected radiation from a respective transmit/receive lens and mixing the received reflected radiation with a part of the local oscillator beam from the polarization adjuster for optical heterodyne detection; and at least three transmit/receive switches, with each of the transmit/receive switches disposed between and interconnecting the single mode fiber amplifier and one of the transmit/receive lenses, and with each of the transmit/receive switches configured for directing the part of the first portion of the amplified laser beam from the single mode fiber amplifier to a respective transmit/receive lens and directing the received reflected radiation from the respective transmit/receive lens to one of the at least three photoreceivers.

14. The sensor system as set forth in claim 13, further comprising a primary laser beam splitter disposed between and interconnecting the amplifier and the polarization adjuster with the frequency modulator, and configured for splitting the modulated laser beam into the first portion directed toward the amplifier and the second portion directed toward the polarization adjuster.

15. The sensor system as set forth in claim 13, further compromising a laser beam splitter disposed between and interconnecting the amplifier and the at least three transmit/receive switches, and configured for splitting the first portion of the amplified laser beam into equal parts directed toward each of the transmit/receive switches.

16. The sensor system as set forth in claim 13, further comprising a photoreceiver laser beam splitter disposed between and interconnecting the polarization adjuster and the at least three photoreceivers, and configured for splitting the local oscillator beam from the polarization adjuster into equal parts directed toward each of the photoreceivers.

* * * * *